Oct. 9, 1951  W. DOMITROVIC  2,570,530
FARM WAGON WITH CONTINUOUS CONVEYER
Filed June 25, 1948  2 Sheets-Sheet 1
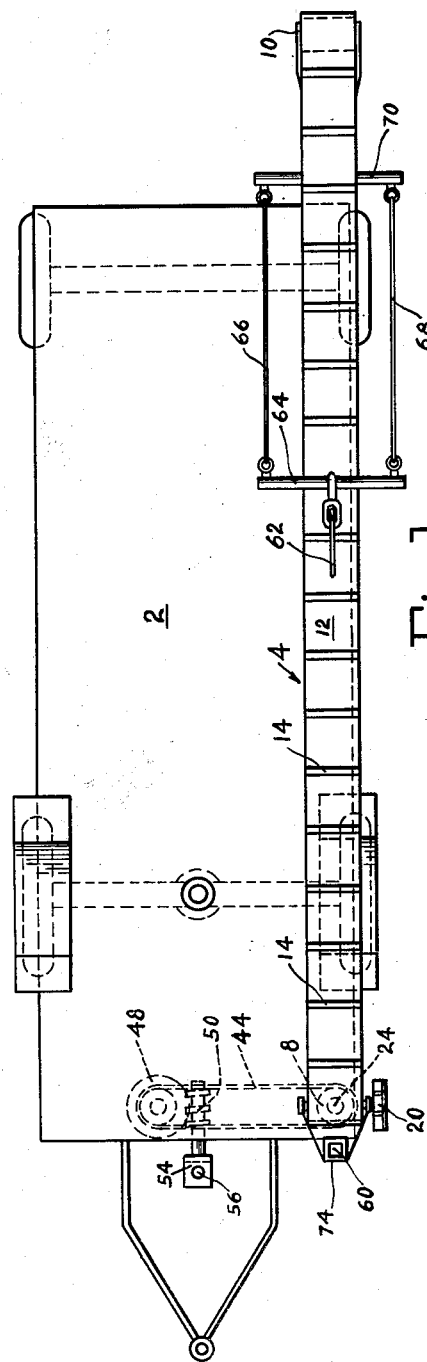
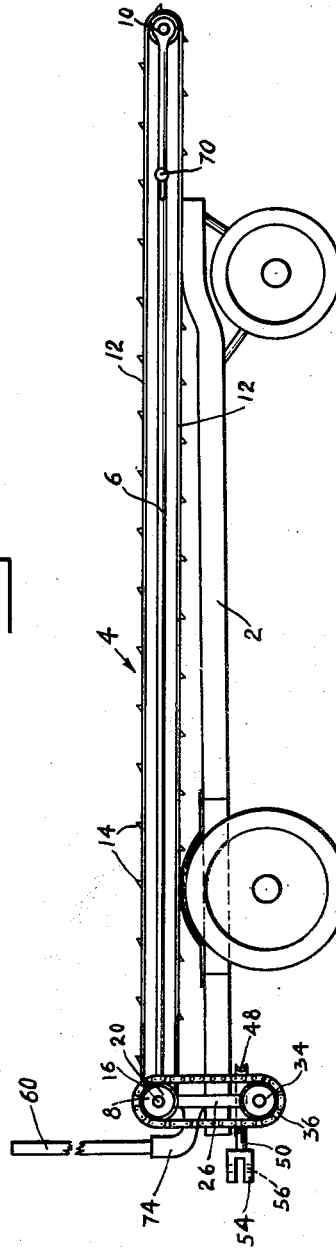
INVENTOR.
WILLIAM DOMITROVIC
BY
Christy, Parmelee & Strickland,
Attorneys Oct. 9, 1951     W. DOMITROVIC     2,570,530
FARM WAGON WITH CONTINUOUS CONVEYER
Filed June 25, 1948     2 Sheets-Sheet 2
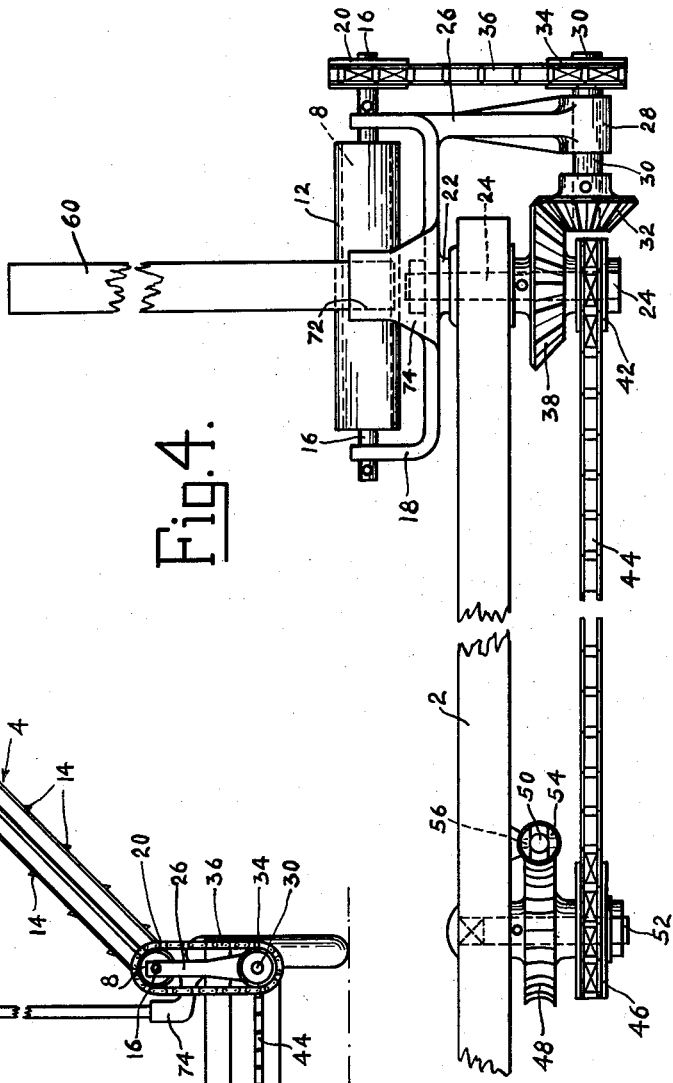
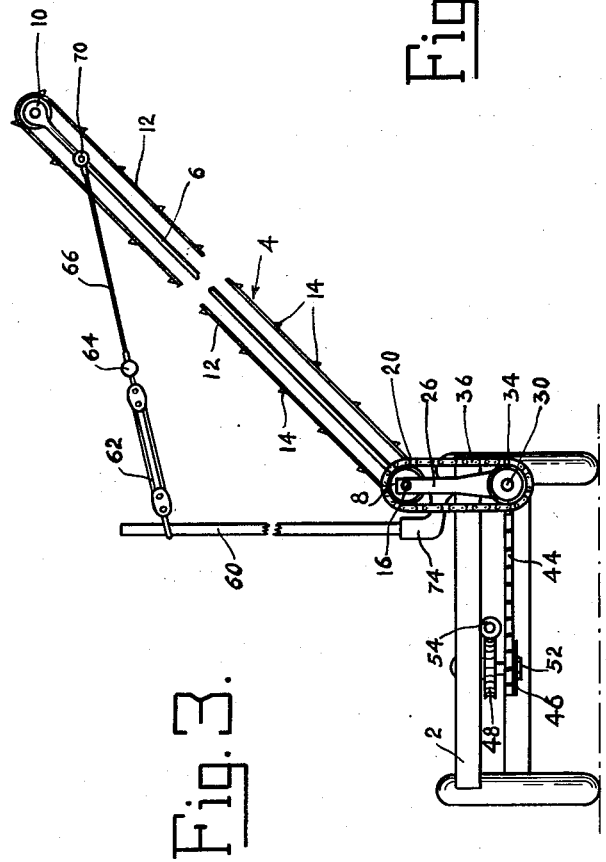
INVENTOR.
WILLIAM DOMITROVIC
BY Patented Oct. 9, 1951

2,570,530

UNITED STATES PATENT OFFICE 2,570,530

FARM WAGON WITH CONTINUOUS CONVEYER

William Domitrovic, Canonsburg, Pa.

Application June 25, 1948, Serial No. 35,267

5 Claims. (Cl. 214—83.26)

This invention relates to a farm wagon and, more particularly, to an improved farm wagon provided with mechanism for facilitating the loading and unloading of the wagon with articles such as bales of hay.

The operation of so-called pick-up balers which gather loose hay from the ground and tie the hay into bales which are then discharged from the rear of the machine onto the ground is well known. The bales of hay are then loaded on a hay wagon following the baler and then carried to a barn for unloading and storing in the mow. The operations of loading and unloading the wagon are carried on at different elevations with respect to the wagon and considerable energy is expended where such operations are accomplished manually.

One of the principal objects of this invention is to provide an improved farm wagon having mechanism which is particularly adapted to facilitate the loading and unloading of the wagon, and which will eliminate the manual labor heretofore required for such operations. To this end, the wagon is provided with a continuous conveyor which may be pivoted to different positions with respect to the wagon and on which the articles to be loaded or unloaded may be placed and thus elevated or lowered with respect to the wagon. The conveyor can be used to elevate articles from the ground to the wagon during loading operations, and, in addition, can be used to elevate the articles with respect to the wagon during unloading operations.

A further object of the invention is to provide an improved mounting for a continuous conveyor on a farm wagon, by which the position of the conveyor may be adjusted universally with respect to the wagon.

A still further object of the invention is to provide a power drive for a continuous conveyor mechanism of the character referred to which requires no attention in order to change the angular position of the conveyor.

Other objects and advantages of the invention will become apparent from the following description.

In the drawings there is shown a preferred embodiment of the invention. In this showing:

Fig. 1 is a plan view of a farm wagon provided with a continuous conveyor mechanism constructed in accordance with the principles of this invention;

Fig. 2 is a side elevational view of the apparatus shown in Fig. 1;

Fig. 3 is a front elevational view of the apparatus shown in Fig. 1, illustrating the conveyor in an elevated or working position; and Fig. 4 is an enlarged fragmentary elevational view of a portion illustrating in detail the power transmission assembly for the conveyor.

Referring to Fig. 1 of the drawings, the numeral 2 designates a farm hay wagon of a conventional low-bed type having a continuous conveyor 4 mounted along one side thereof. The conveyor 4 comprises a metal framework 6 having yokes at each end, to which rolls 8 and 10 are rotatably connected, and an endless conveyor belt 12 trained over the rolls 8 and 10. The belt 12 is provided with cleats 14 extending transversely thereof, as shown in Fig. 2, for holding bales of hay or other articles against slipping on the conveyor belt 12 when it is positioned at a steep angle.

The roll 8 is a power or driving roll for the conveyor belt 12, and is keyed to a drive shaft 16 rotatably supported by the arms of a yoke 18. The shaft 16 is driven by a sprocket wheel 20 which is mounted on an end thereof, as best shown in Fig. 4. A power take-off drive is provided for driving the sprocket wheel from the take-off unit of a tractor or other suitable apparatus in a manner to be described.

The yoke 18 is mounted on a vertical thrust bearing 22 carried by the wagon 2 for pivotal movement about a shaft 24 extending vertically of the wagon at one corner thereof. The yoke 18 is provided with a vertically depending arm 26 having a bearing 28 at its lower end in which a horizontally extending shaft 30 is rotatably mounted. The shaft 30 extends radially with respect to the axis of rotation of the yoke 18 which carries its supporting bearing 28 and is provided with a bevel gear 32 connected to its inner end and a sprocket wheel 34 connected to its outer end. An endless sprocket chain 36 is trained over the sprocket wheels 34 and 20 to provide a driving connection for the roller 8.

Bevel gear 32 is in meshing engagement with a bevel gear 38 which is journaled on shaft 24. A sprocket wheel 42 is mounted on the shaft 24 and is connected to gear 38 in such manner that rotation of the sprocket wheel 42 will impart rotation to the gear 38. An endless sprocket chain 44 is trained over the sprocket wheel 42 and over a sprocket wheel 46 to provide a driving connection between such wheels. The sprocket wheel 46 is connected for rotation with a worm gear 48 which is in meshing engagement with a worm pinion 50. The worm gear 48 and sprocket wheel 42 are mounted on a common annulus which is journaled on a shaft 52 carried by the wagon 2. The pinion 50, as best shown in Fig. 1, is connected to a coupling member 54 having an opening 56 for the reception of a coupling pin (not shown) of any suitable power take-off mechanism such as is commonly provided on a tractor.

Upon connection of the coupling member 54 to a power take-off, rotation of the worm pinion 50 will drive the worm gear 48 and the sprocket wheel 46 will be driven to impart motion to the sprocket chain 44. Motion of the chain 44 will be transmitted through sprocket wheel 42 and gears 38 and 32 to the sprocket chain assembly comprising the parts 34, 36 and 20. Rotation of the sprocket wheel 20 will thus be effective to rotate the roller 8 which will impart movement to the endless conveyor 4 trained thereover. Attention is particularly invited to the fact that the arrangement of the shaft 30 in a radial direction with respect to the shaft 24 is such that the yoke 18 may be rotated to position the endless conveyor 4 without interrupting the driving connection between the gears 38 and 32. This is due to the fact that the shaft 30 is parallel to the shaft 16 and perpendicular to the shaft 24. Consequently, when the yoke 18 is rotated, the shaft 30 and gear 32 will rotate about the gear 38 on the shaft 24 without disrupting the connection between such gears. In this manner, the conveyor 4 may be swung to different angular positions in a horizontal plane with respect to the wagon 2 without stopping the motion of the conveyor 4. The pivotal movement of the yoke 18 thus provides a positional adjustment for the conveyor 4 about the axis of the shaft 24 which is vertical with respect to the wagon 2.

As pointed out above, the framework 6 of the conveyor 4 is provided with yokes at its ends to which the rollers 8 and 10 are rotatably connected. Since the axis of the driven roller 8 is horizontal, it will thus be seen that the conveyor 4 may be pivoted about the axis of the roller 8 and may thus have its position adjusted angularly in a vertical plane. The angular position of the conveyor is controlled by a mast 60 extending vertically from the wagon 2, which is connected by a block and tackle 62 to a bar 64, which in turn is connected by links 66 and 68 to a bar 70 extending transversely of the frame 6 as best shown in Figs. 1 and 3. By adjusting the block and tackle connection 62, the angular position of the conveyor 4 may be readily pivoted about the shaft 16 and adjusted angularly in a vertical plane with respect to the mast 60. The mast 60 is detachably mounted in a recess 72 provided in an arm 74 connected to the yoke 18. In this manner, the mast 60 will pivot with the yoke 18 as the yoke 18 is swung to vary the position of the conveyor 4 with respect to a horizontal plane.

From the foregoing, it will be seen that provision is made for driving the conveyor belt 12, and that the position of the belt is adjustable in both horizontal and vertical planes with respect to the wagon 2. When the wagon 2 is being hauled from one site to the other, the conveyor is swung to the position shown in Figs. 1 and 2, in which it is supported along one side of the wagon. When the wagon is in position for loading with articles such as bales of hay which have been deposited on the ground by a haybaler, the conveyor 4 is swung to a position with its free end or the roller 10 positioned closely adjacent the ground so that the articles or bales of hay may be easily placed on the conveyor belt 12 which will carry such articles to a wagon where they may be picked up and stocked in a position by an attendant. After the wagon is loaded, the conveyor 4 is positioned as shown in Figs. 1 and 2 so that the wagon may be hauled to another position for unloading. During unloading, the conveyor may be utilized for delivering the articles conveniently to positions for storing. The conveyor 4 is particularly advantageous in unloading operations where the articles being unloaded are to be delivered to an elevated position with respect to the wagon 2. This arrangement is particularly desirable where the wagon is loaded with bales of hay which are to be stored in a hay mow, in which case the wagon may be driven onto the barn floor and the conveyor utilized to deliver the bales directly into the mow. Although a wagon equipped with conveyor mechanism in accordance with this invention is particularly useful in connection with handling baled hay, its utility for other purposes will be readily apparent.

While I have illustrated and described one specific embodiment of my invention, it will be understood that this is merely by way of illustration, and that various changes and modifications may be made with the contemplation of my invention and under the scope of the following claims.

I claim:

1. In material handling apparatus, the combination comprising a wagon, a shaft mounted on and extending vertically of said wagon, a yoke mounted for rotation about said shaft, a horizontal shaft rotatably supported by said yoke, a roll mounted on said horizontal shaft, a frame extending outwardly from said horizontal shaft and pivotal about its axis, a roll mounted at the outer end of said frame, an endless conveyor belt trained over said rolls for delivering materials to and from said wagon during loading and unloading operations, a driving member mounted on said yoke in axial alignment with said horizontal shaft for rotating said first named roll, a driving shaft arranged parallel to said horizontal shaft and mounted for rotation with said yoke so that the parallel relation is maintained at all times, a pair of bevel gears in meshing engagement and mounted respectively on said vertical shaft and driving shaft for imparting rotation to said driving shaft, and a driving connection between said driving shaft and driving member.

2. Material handling apparatus for attachment to a wagon comprising a conveyor frame having rolls at the ends thereof with an endless conveyor trained over said rolls, and means mounting said frame on said wagon comprising a shaft mounted in a vertical position on said wagon, a yoke pivotally supporting one end of said frame for adjustable movement of the frame in a vertical plane, said yoke being rotatably mounted on the upper end of said shaft for adjustable movement of said frame in a horizontal plane, and a drive for said conveyor comprising a drive gear mounted on the lower end of said shaft, a horizontal drive shaft extending radially of said gear, a driven gear on said drive shaft in meshing engagement with said drive gear, a driving connection for said drive shaft with said conveyor, and means mounting said horizontal drive shaft for rotation with said yoke about said vertical shaft.

3. An attachment for mounting an endless conveyor frame on a wagon comprising a shaft mounted in a vertical position on the wagon, a yoke rotatable about the upper end of said shaft, the yoke providing a pivotal support for said frame by which its position may be adjusted in a vertical plane, and means for driving conveyor apparatus on said frame comprising a drive gear on the lower end of said shaft, a horizontal drive shaft extending radially of said drive gear, a bracket supporting said drive shaft and secured to said yoke for rotation therewith, and a gear meshing with said drive gear to provide a driving connection for said drive gear with said drive shaft, said connection being rotatable about said drive gear in response to rotation of said bracket by said yoke.

4. An attachment for mounting an endless conveyor frame on a wagon comprising a shaft mounted in a vertical position on the wagon, a yoke rotatable about the upper end of said shaft, the yoke providing a pivotal support for said frame by which its position may be adjusted in a vertical plane, a vertically extending mast connected to said yoke for rotation therewith, an adjustable connection between said mast and frame for maintaining the frame in a selected angular position relative to the mast while the frame is rotated by said yoke about the axis of said shaft, and means for driving conveyor apparatus on said frame comprising a drive gear on the lower end of said shaft, a horizontal drive shaft extending radially of said drive gear, a bracket supporting said drive shaft and secured to said yoke for rotation therewith, and a gear meshing with said drive gear to provide a driving connection for said drive gear with said drive shaft, said connection being rotatable about said drive gear in response to rotation of said bracket by said yoke.

5. An attachment for mounting an endless conveyor frame on a wagon comprising a shaft mounted in a vertical position on the wagon, a yoke rotatable about the upper end of said shaft, the yoke providing a pivotal support for said frame by which its position may be adjusted in a vertical plane, a vertically extending mast connected to said yoke for rotation therewith, and an adjustable connection between said mast and frame for maintaining the frame in a selected angular position relative to the mast while the frame is rotated by said yoke about the axis of said shaft.

WILLIAM DOMITROVIC.

REFERENCES CITED

The following references are of record in the file of this patent:

UNITED STATES PATENTS

| Number | Name | Date |
|---|---|---|
| 1,388,245 | Eaton | Aug. 23, 1921 |
| 2,093,300 | Adams et al. | Sept. 14, 1937 |
| 2,401,465 | Cwicig | June 4, 1946 |
| 2,402,465 | Templeton | June 18, 1946 |
| 2,410,996 | Patterson | Nov. 12, 1946 |
| 2,451,656 | Birch | Oct. 19, 1948 |
| 2,458,031 | Rome | Jan. 4, 1949 |
| 2,488,407 | Hoffstetter | Nov. 15, 1949 |